US012099786B1

(12) United States Patent
Bürg et al.

(10) Patent No.: US 12,099,786 B1
(45) Date of Patent: Sep. 24, 2024

(54) USING HIERARCHICAL FINITE ELEMENT SHAPE FUNCTIONS IN MATERIAL POINT METHOD-BASED GEOTECHNICAL ANALYSIS AND SIMULATION

(71) Applicant: Bentley Systems, Incorporated, Exton, PA (US)

(72) Inventors: Markus Bürg, The Hague (NL); Liang Jin Lim, Pahang (MY)

(73) Assignee: Bentley Systems, Incorporated, Exton, PA (US)

( * ) Notice: Subject to any disclaimer, the term of this patent is extended or adjusted under 35 U.S.C. 154(b) by 742 days.

(21) Appl. No.: 17/347,292

(22) Filed: Jun. 14, 2021

(51) Int. Cl.
*G06F 30/23* (2020.01)
*G01V 20/00* (2024.01)

(52) U.S. Cl.
CPC .............. *G06F 30/23* (2020.01); *G01V 20/00* (2024.01)

(58) Field of Classification Search
CPC ......... G06F 30/00; G06F 30/23; G01V 20/00; G01V 2210/1232
USPC ...................................................... 703/10, 6
See application file for complete search history.

(56) References Cited

U.S. PATENT DOCUMENTS 11,232,648 B1 * 1/2022 Bürg ...................... G06F 30/23

FOREIGN PATENT DOCUMENTS

CN 112733242 A * 4/2021 ............. G06F 30/13
CN 112900410 A * 6/2021 ............... E02D 1/08

OTHER PUBLICATIONS

Al-Kafaji, "Formulation of a Dynamic Material Point Method (MPM) for Geomechanical Problems", 2013. (Year: 2013).*
Bürg, Markus, et al., "Application of a Second-Order Implicit Material Point Method," Elsevier Ltd., ScienceDirect, Procedia Engineering, vol. 175, 1st International Conference on the Material Point Method, MPM 2017, Feb. 27, 2017, pp. 279-286.
De Koster, Pascal, "B-spline MPM in 2D and 3D," Department of Numerical Analysis, Delft, University of Technology, Deltares, Mar. 2018, pp. 1-29.

(Continued)

*Primary Examiner* — Cedric Johnson
(74) *Attorney, Agent, or Firm* — Cesari and McKenna, LLP; James A. Blanchette

(57) ABSTRACT

In one embodiment, material points are received that cover at least a portion of an element of a background mesh that describes a continuum of soil, rock and/or groundwater. MPM-based geotechnical analysis and simulation is conducted at least in part by performing a numerical integration over the material points to produce a system matrix and right-hand side vector. The numerical integration applies hierarchical shape functions to the material points. The MPM-based geotechnical analysis and simulation also may subtract out contributions of any lower-order polynomials from higher-order polynomials of the hierarchical shape functions when interpolating one or more state variables for the material points to the background mesh. The MPM-based geotechnical analysis and simulation also may subtract out contributions any lower-order polynomials from higher-order polynomials of the hierarchical shape functions when calculating one or more boundary conditions for the material points.

20 Claims, 11 Drawing Sheets

(56) References Cited

OTHER PUBLICATIONS

Motlagh, Y. Ghaffari, et al., "A High-Order Material Point Method," Proceedings of the 24$^{th}$ UK Conference of the Association for Computational Mechanics in Engineering, Cardiff University, Cardiff, Mar. 31-Apr. 1, 2016, pp. 352-355.

Tielen, Roel, et al., "A High Order Material Point Method," Elsevier Ltd., ScienceDirect, Procedia Engineering, vol. 175, 1$^{st}$ International Conference on the Material Point Method, MPM 2017, Feb. 27, 2017, pp. 265-272.

U.S. Appl. No. 17/101,556, filed Nov. 23, 2020 by Markus Bürget al. for Systems, Methods, and Media for Modifying a Mesh for a Material Point Method Utilized for Geotechnical Engineering, pp. 1-52.

U.S. Appl. No. 17/103,181, filed Nov. 24, 2020 by Markus Bürg for Systems, Methods, and Media for Generating a Signed Distance Field to a Surface of a Point Cloud for a Material Point Method Utilized for Geotechnical Engineering, pp. 1-50.

U.S. Appl. No. 17/166,309, filed Feb. 3, 2021 by Liang Jin Lim et al. for Systems, Methods, and Media for Generating Spawned Material Points for a Material Point Method Utilized for Geotechnical Engineering, pp. 1-43.

U.S. Appl. No. 17/222,138, filed Apr. 5, 2021 by Liang Jin Lim et al. for Systems, Methods, and Media for Relaxing a Region of a Mesh for a Material Point Method Utilized for Geotechnical Engineering, pp. 1-41.

U.S. Patent Application Serial No.: Not Yet Assigned, Filed: Jun. 14, 2021 by Markus Burg et al. for Improving Accuracy of Numerical Integration in Material Point Method-Based Geotechnical Analysis and Simulation by Optimizing Integration Weights, pp. 1-22.

Wobbes, Elizaveta, et al., "Conservative Taylor Least Squares Reconstruction With Application to Material Point Methods," Wiley, John Wiley & Sons, Ltd., Research Article, International Journal for Numerical Methods in Engineering, Sep. 8, 2018, pp. 271-290.

Zienkiewicz, O.C. ,et al., "Chapter 8: 'Standard' and hierarchical Element Shape Functions: Some General Families of $C_0$ Continuity," The Finite Element Method: Its Basis and Fundamentals, Sixth edition, Elsevier Butterworth-Heinemann, Sixth edition, 2005, pp. 164-199.

* cited by examiner

USING HIERARCHICAL FINITE ELEMENT SHAPE FUNCTIONS IN MATERIAL POINT METHOD-BASED GEOTECHNICAL ANALYSIS AND SIMULATION

BACKGROUND

Technical Field

The present disclosure relates generally to geotechnical analysis and simulation, and more specifically to techniques for using higher-order shape functions in material point method-based geotechnical analysis and simulation.

Background Information

Geotechnical engineering involves applying scientific methods and engineering principles to acquire, interpret and use knowledge regarding the Earth's crust to solve engineering problems and design structures. As part of this task, geotechnical engineering software is often used to model soil, rock and/or groundwater, and such models are analyzed and simulated to derive useful predictions regarding the behavior, including deformation, stability, interactions, and the like. Geotechnical analysis and simulation may be used for a variety of useful purposes, including predicting, preventing or mitigating natural hazards (e.g., avalanches, landslides, volcanic eruptions, etc.); designing and predicting performance of man-made earthen structures (e.g., earthen dams); and/or designing and predicting performance of man-made structures whose foundations are built upon earth (e.g., buildings, bridges, concrete dams, towers, etc.).

A variety of numerical methods may be used by geotechnical engineering software to model soil, rock and/or groundwater and perform geotechnical analysis and simulation thereof. One longstanding method is the finite element method (FEM). In FEM, a continuum of soil, rock and/or groundwater is described by a mesh composed of discrete geometric elements (e.g., areas such as triangles and quadrilaterals; volumes; etc.) formed from nodes which carry information related to a boundary value problem to be solved.

A newer method is the Material Point Method (MPM). MPM may be particularly well suited for analysis and simulation where there are large deformation behaviors, post-liquefaction behaviors (e.g., the post-failure liquid-like behaviors of landslides), penetrations (such as in cone penetration testing (CPT) and pile installation), and/or scouring behaviors (e.g., such as with underwater pipelines). In MPM, a continuum of soil, rock and/or groundwater is described by a number of Lagrangian elements referred to a "material points" which are associated with information (e.g., mass, volume, stress, state variables (such as velocity and acceleration), etc.) according to the material it represents. The material points are surrounded by a computational mesh (referred to as a "background mesh") composed of elements formed from nodes, that extends over the continuum. As the analysis and simulation proceeds over time steps, the material points are tracked and their states updated so that they carry the complete solution. To determine the motion of the material points in an efficient manner, information from the material points may be interpolated onto the background mesh. Equations may be solved on the background mesh and the solution on the background mesh is then used to update the material points over time steps. The background mesh is restored to its original location at the end of each time step. In this way, mesh entanglement is avoided and, as such, MPM is often categorized as a "meshless" or "meshfree" method.

Similar to FEA, in MPM a numerical integration is typically performed over each element at each time step of the analysis or simulation to obtain the entries of a system matrix and right-hand side vector of a system that can be solved to make predictions. In this integration, a set of polynomials referred to as "finite element shape functions" (or simply "shape functions") are employed to interpolate the solution between the discrete integration points. Such shape functions may be categorized into families and associated with orders (e.g., 1, 2, 3 . . . n) indicating the degree of polynomial which the method can represent accurately. In FEA, the family of Lagrangian shape functions are often used successfully for all orders. Most commonly used higher-order Lagrangian shape functions have positive and negative parts, leading to internal cancellations within an element when integrated. However, this typically is not an issue in FEA since integration is always performed over full elements.

However, this is not the case in MPM. In MPM, material points are used as the integration points, and material points may only partially cover an element. Depending on the exact position of the material points within an element, the negative part of a Lagrangian shape function may be prevalent in the integration. This may lead to a badly conditioned, or even singular, system matrix, and thus unstable numerical solutions.

The potential for unstable numerical solutions when higher-order Lagrangian shape functions are used has hindered the adoption of MPM in geotechnical engineering software for performing geotechnical analysis and simulation. Further, previous attempts to address this issue have suffered shortcomings. Some approaches have involved removing negative parts of Lagrangian shape functions. However, this may significantly worsen the conditioning of the system matrix, reduce accuracy of numerical integration over an element (since the shape functions become piecewise-defined polynomials within the element) and, where elements that are only partially covered with material points, lead to instability (due to stronger localization of the shape function). Other approaches have involved using B-splines as basis functions. However, this may compromise the efficiency of computations, increasing processing resource consumption. This may be due to the fact that with B-splines all shape functions become coupled with each other, whereas classically only shape functions within an element and its direct neighbors are coupled. Further, this may increase memory consumption since the system matrix may be much less sparse. A wide variety of other issues hinder use of B-splines as basis functions.

Accordingly, there is a need for new techniques for using shape functions in material point method-based geotechnical analysis and simulation.

SUMMARY

In one or more embodiments, techniques are provided for using hierarchical shape functions in MPM-based geotechnical analysis and simulation. Hierarchical shape functions are a family of shape functions that are a composition of lower-order and higher-order polynomials. Due to strict non-negativity properties of hierarchical shape functions, there are no internal cancellations within an element when integrated. Therefore, integration over only a part of an element still will result in a well-conditioned system matrix and right-hand side vector, and a stable numerical solution.

Hierarchical shape functions do not generally satisfy partition-of-unit and Kronecker delta properties. Compensation factor that subtract the effects of lower-order components of the hierarchical shape functions when interpolating state variables to the background mesh and calculating boundary conditions may be employed to address these issues.

In one specific implementation, a module of geotechnical engineering software may receive material points that cover at least a portion of an element of a background mesh that describes a continuum of soil, rock and/or groundwater. The module may conduct MPM-based geotechnical analysis and simulation at least in part by performing a numerical integration over the material points to produce a system matrix and right-hand side vector. The numerical integration applies hierarchical shape functions to the material points. The MPM-based geotechnical analysis and simulation also may subtract out contributions of any lower-order polynomials from higher-order polynomials of the hierarchical shape functions when interpolating one or more state variables for the material points to the background mesh. The MPM-based geotechnical analysis and simulation also may subtract out contributions any lower-order polynomials from higher-order polynomials of the hierarchical shape functions when calculating one or more boundary conditions for the material points. The results of the MPM-based geotechnical analysis and simulation may be displayed by the geotechnical engineering software in a user interface, stored to an computing device-readable medium, or otherwise used.

It should be understood that a variety of additional features and alternative embodiments may be implemented other than those discussed in this Summary. This Summary is intended simply as a brief introduction to the reader for the further description that follows and does not indicate or imply that the examples mentioned herein cover all aspects of the disclosure or are necessary or essential aspects of the disclosure.

BRIEF DESCRIPTION OF THE DRAWINGS

The description below refers to the accompanying drawings of example embodiments, of which.

DETAILED DESCRIPTION

Figure 1:
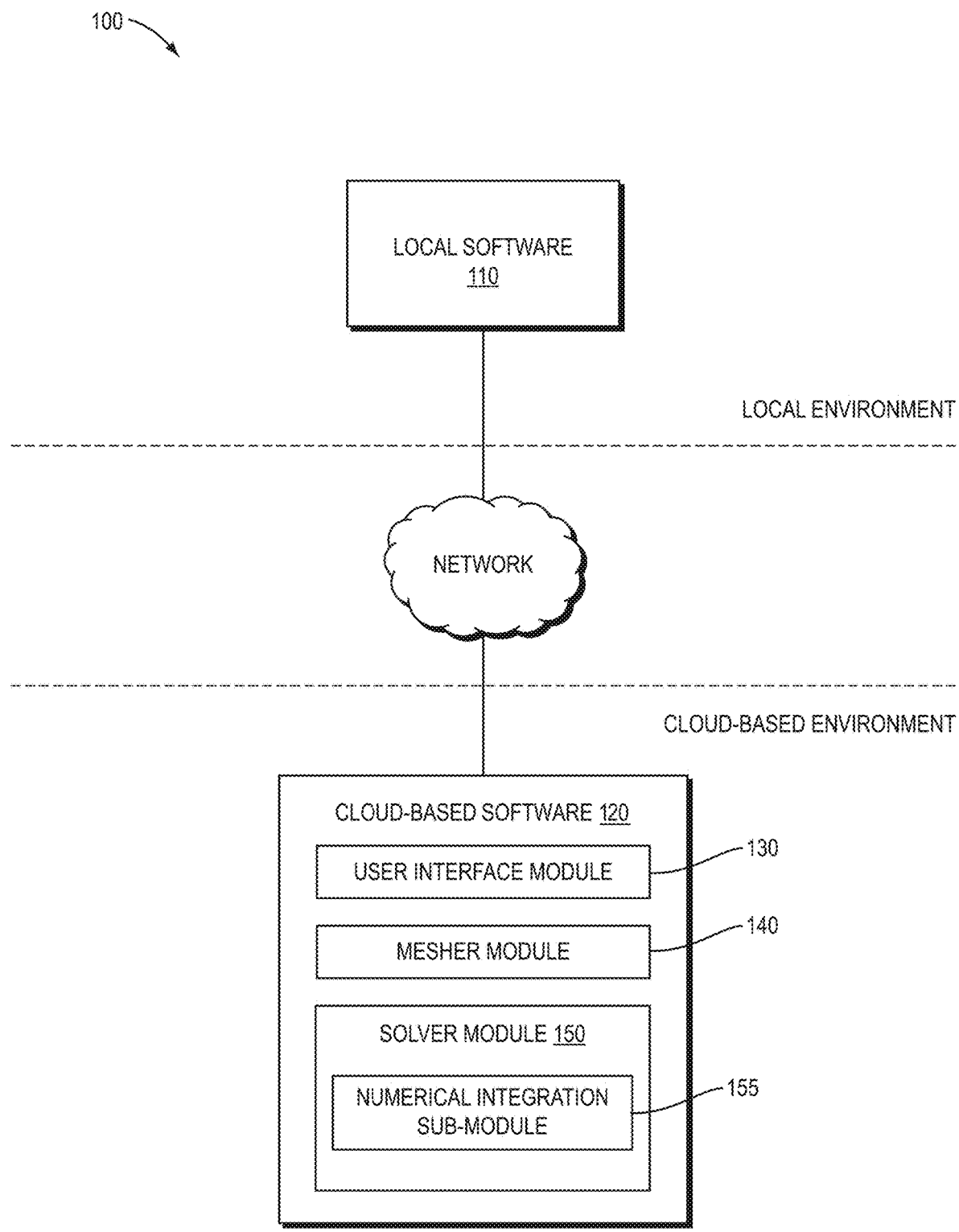
FIG. 1 is a high-level block diagram of an example software architecture for geotechnical engineering software that may perform MPM-based geotechnical analysis and simulation.

FIG. 1 is a high-level block diagram of an example software architecture 100 for geotechnical engineering software that may perform MPM-based geotechnical analysis and simulation. The geotechnical engineering software may be a stand-alone software application or a component of a larger software application. In one example implementation, the geotechnical engineering software is the PLAXIS®3D geotechnical engineering software available from Bentley Systems of Exton, PA. However, it should be understood that the geotechnical engineering software may take a variety of other forms.

The geotechnical engineering software may be divided into local software 110 that executes on one or more computing devices local to an end-user (collectively "local devices") and, in some cases, cloud-based software 120 that is executed on one or more computing devices remote from the end-user (collectively "cloud computing devices") accessible via a network (e.g., the Internet). Each computing device may include processors, memory/storage, a display screen, and other hardware (not shown) for executing software, storing data and/or displaying information. The local software 110 may include a number of software modules operating on a local device and the cloud-based software 120, if present, may include, additional software modules operating on cloud computing devices. Tasks may be divided in a variety of different manners among the software modules. For example, in one implementation, software modules of the local software 110 may be responsible for performing non-processing intensive operations and software modules of the cloud-based software 120 may perform more processing intensive operations. However, many other arrangements may be employed.

The software modules may include a user interface module 130, a mesher module 140 and a solver module 150. The user interface module 130 may be responsible for providing a user interface (e.g., a graphical user interface and/or a command line interface,) for receiving user input and displaying output. The mesher module 140 may be responsible for generating a computational mesh (background mesh) composed of elements formed from nodes that model a continuum of soil, rock and/or groundwater, for example based on information (e.g., a model, geometric description, parameters/conditions, etc.) selected or provided in the user interface. The solver module 150 may be responsible for using MPM to analyze and simulate behavior (e.g., deformation, stability, interactions, and the like) of the soil, rock and/or groundwater. To that end, the solver module 150 may associate material points with information (e.g., mass, volume, stress, state variables, etc.) and move the material points through elements of the background mesh over time steps of analysis and simulation. Results of the analysis and simulation may be displayed by the user interface module 130, stored in a file, database, etc., provided to other software, and the like.

Figure 2:
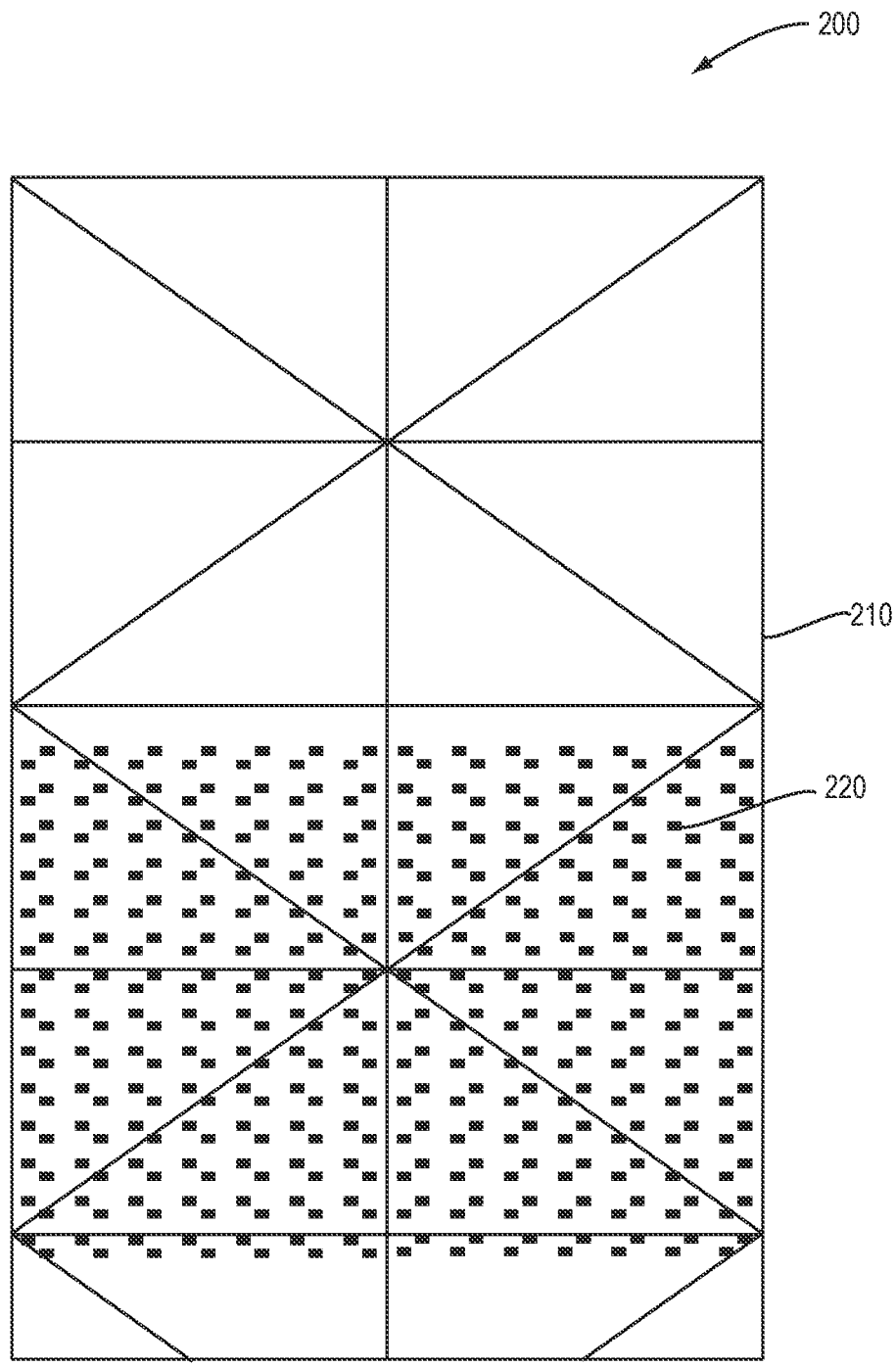
FIG. 2 is a diagram of an example computational mesh (background mesh) and material points.

FIG. 2 is a diagram 200 of an example computational mesh (background mesh) 210 and material points 220 that may assist in understanding the operation of the mesher module 140 and solver module 150. The background mesh

210 and material points 220 may represent a continuum of soil, rock and/or groundwater. The background mesh 210, is composed of elements (e.g., triangles) formed from nodes. The material points 220 are distributed within the elements. Some elements may be fully covered by material points, while other elements may be only partially covered.

When performing MPM-based geotechnical analysis and simulation using a background mesh and material points such as shown in the example in FIG. 2, the solver module 150, working together with a numerical integration sub-module 155, may perform numerical integration over each element at each time step of the analysis or simulation to obtain the entries of a system matrix and right-hand side vector. An example integration may be given as:

$$\int_K N_i \approx \Sigma_p w_p N_i(x_p)$$

where K is an element of the background mesh, $N_i$ is a finite element shape function, $x_p$ is the position of a material point p, and $w_p$ is the integration weight of the material point p. Higher-order shape functions may be desirable to avoid issues of volumetric locking and inaccurate stresses.

Figure 3A:
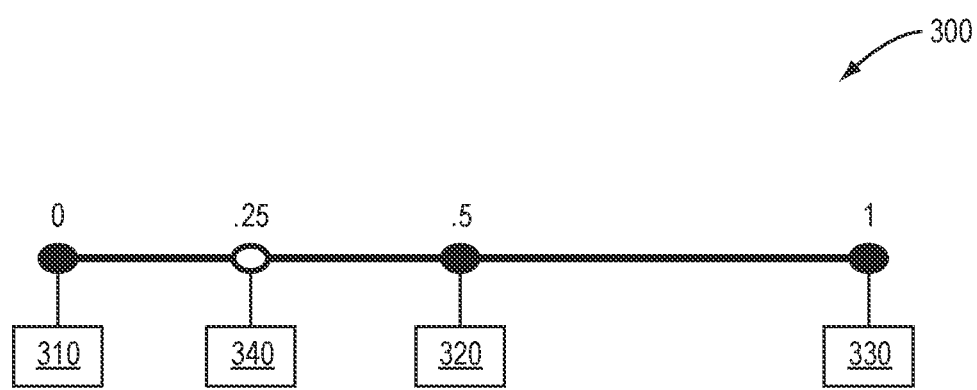
FIG. 3A is a diagram of a one-dimensional linear reference element K=[0,1] with nodes at positions 0, 0.5 and 1, respectively, along an axis and a material point at position 0.25 along the axis.

As mentioned above, one option would be to used higher-order Lagrangian shape functions. However, most widely used higher-order Lagrangian shape functions have positive and negative parts, leading to internal cancellations within an element when integrated. Such issue may be illustrated by considering a simple one-dimensional example. FIG. 3A is a diagram 300 of a one-dimensional linear reference element K=[0,1] with nodes 310, 320, 330 at positions 0, 0.5 and 1, respectively, along an axis and a material point 340 at position 0.25 along the axis. Example quadratic Lagrangian shape functions as defined in 1D for this example may be:

$$N_1(x)=2x^2-3x+1$$

$$N_2(x)=4x-4x^2$$

$$N_3(x)=2x^2-x.$$

Figure 3B:
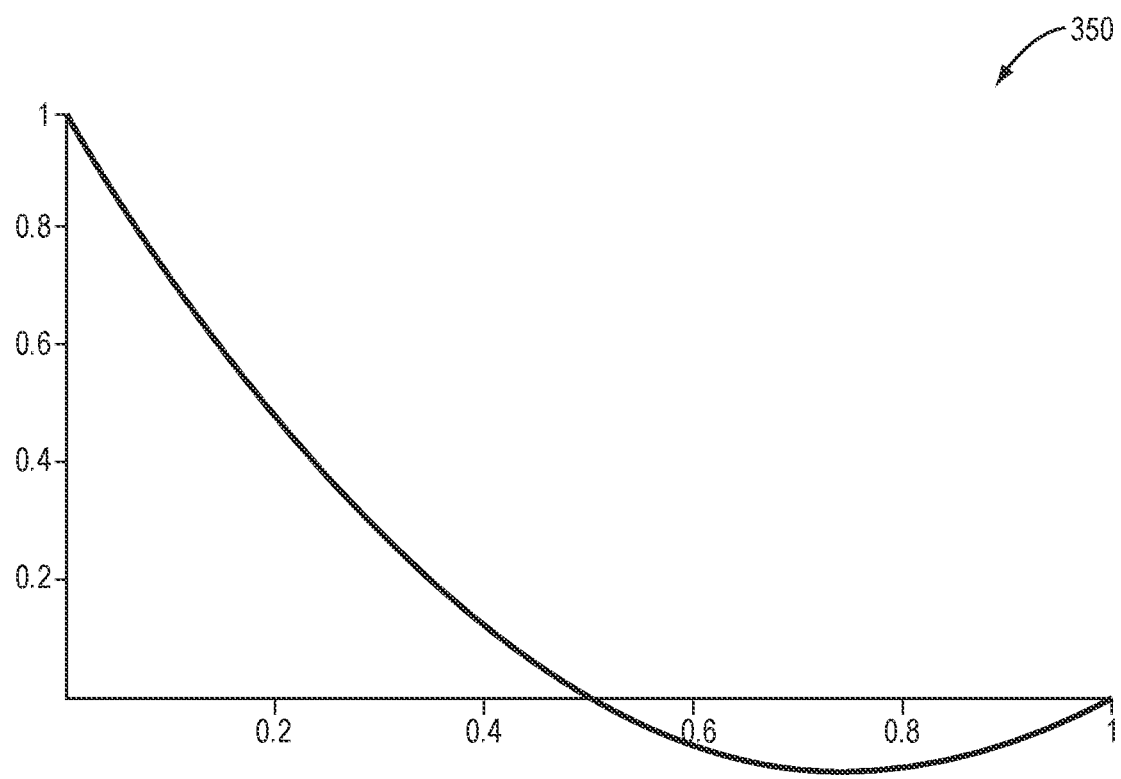
FIG. 3B is a graph of a first example quadratic Lagrangian shape function $N_1$ plotted on the reference element K of FIG. 3A.
Figure 3C:
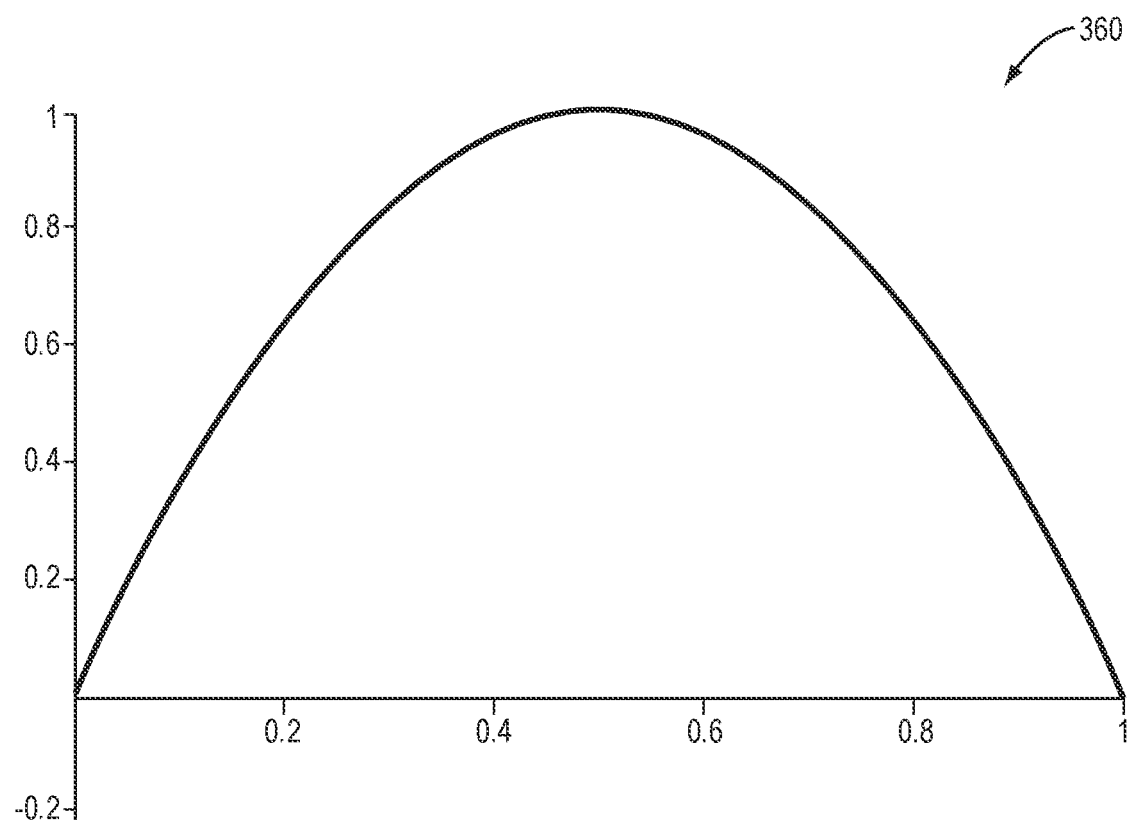
FIG. 3C is a graph of a second example quadratic Lagrangian shape function $N_2$ plotted on the reference element K of FIG. 3A.
Figure 3D:
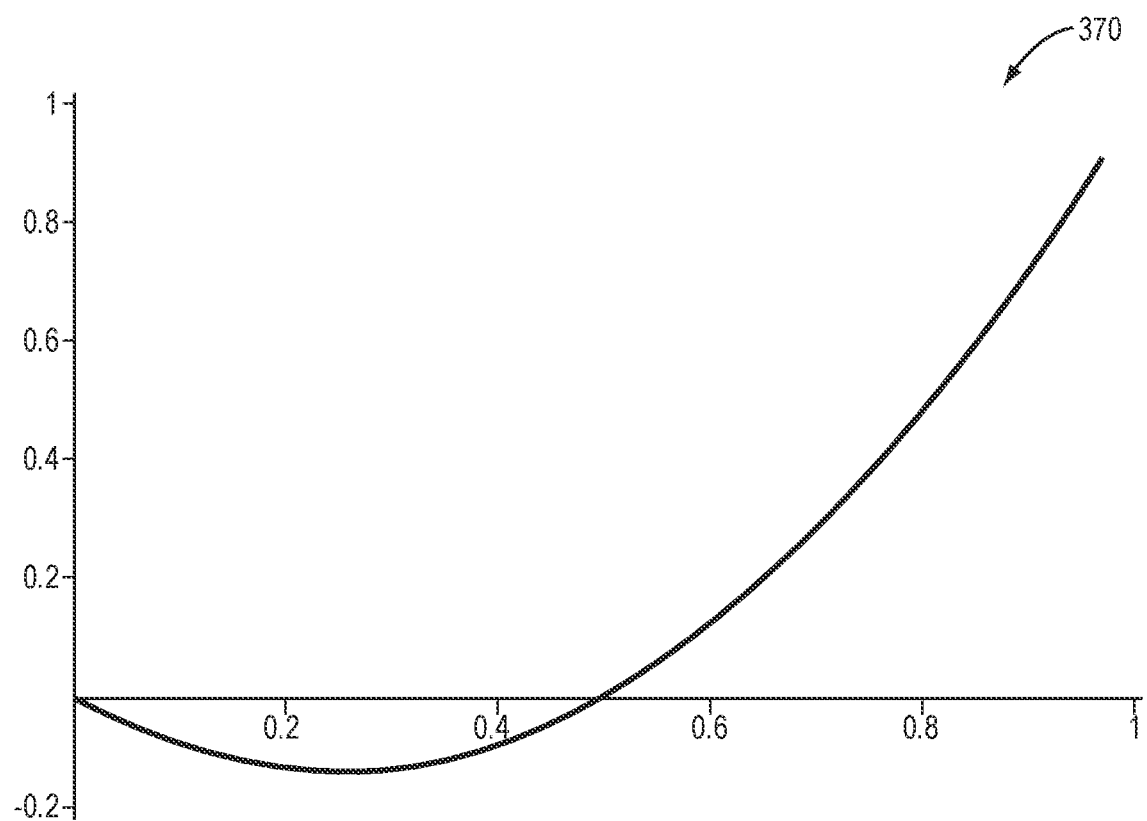
FIG. 3D is a graph of a third quadratic Lagrangian shape function $N_3$ plotted on the reference element K of FIG. 3A.

FIG. 3B is a graph 350 of the first example quadratic Lagrangian shape function $N_1$ plotted on the reference element K of FIG. 3A. FIG. 3C is a graph 360 of the second example quadratic Lagrangian shape function $N_2$ plotted on the reference element K of FIG. 3A. FIG. 3D is a graph 370 of the third quadratic Lagrangian shape function $N_3$ plotted on the reference element K of FIG. 3A. As can be seen from these graphs 350-370, the first and second quadratic Lagrangian shape functions $N_1$, $N_2$ have both positive and negative parts.

Figure 3E:
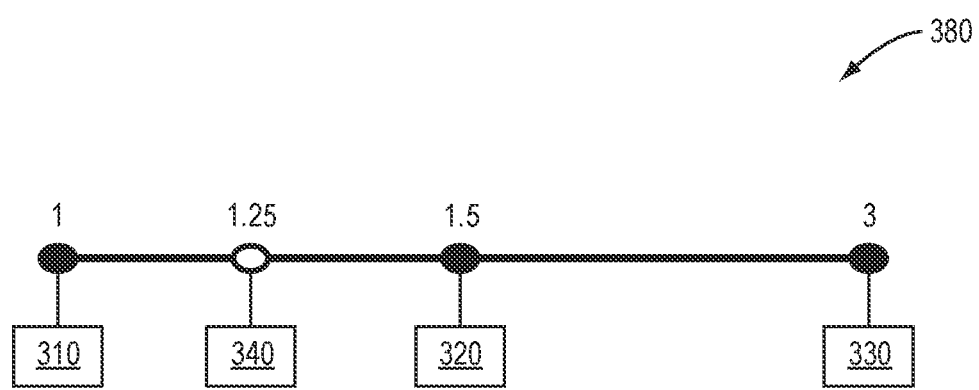
FIG. 3E is a diagram of an expected result to a displacement field u=[1,1,2] applied to reference element K with a nodes at positions 1, 1.5 and 3, respectively, along the axis, and a material point at position 1.25 along the axis.

As mentioned above, the negative part of a Lagrangian shape function may be prevalent in the integration depending on material point location, leading to a badly conditioned system matrix, and unstable numerical solutions. For example, consider a displacement field is applied to the reference element K of FIG. 3A. FIG. 3E is a diagram 380 of an expected result to a displacement field u=[1,1,2] applied to reference element K with a nodes 310, 320, 330 at positions 1, 1.5 and 3, respectively, along the axis and a material point 340 at position 1.25 along the axis. The example quadratic Lagrangian shape functions yield positions of the nodes 310, 320, 330 as expected. However, when computing the new position of the material point 340 there is an issue. In this example, applying the displacement field yields:

$$x=0.023+1N_1)0.25)+1N_2(0.25)+2N_3(0.25)=0.25+0.375+0.75-0.25=1.125.$$

If the displacement on node 3 is large enough (in this case >3) the material point may be located outside the element.

While the above example involves a simple one-dimensional linear reference element and quadratic shape functions, it should be understood that the same issue extends to other element types (e.g., rectangular, triangular, tetrahedral, etc.) that may have greater dimension (e.g., two-dimensions (2-D), three-dimensions (3-D), etc.) and that may be used with other higher-order Lagrangian shape functions (e.g., $3^{rd}$ order, $4^{th}$ order, etc.).

In one or more embodiments, hierarchical shape functions are used in MPM-based geotechnical analysis and simulation in place of higher-order Lagrangian shape functions. Hierarchical shape functions are a family of shape functions that are a composition of lower-order and higher-order polynomials. Hierarchical shape functions may be derived using a number of well-known techniques. A convenient form for hierarchical shape functions in a one-dimensional example may be defined as:

$$N_p^e(\xi) = \begin{cases} \dfrac{1}{p!}(\xi^p - 1) p \text{ even} \\ \dfrac{1}{p!}(\xi^p - \xi) p \text{ odd} \end{cases}$$

where p (≥2) is the degree of the introduced polynomial and ξ is normalized coordinates. It should be understood, however, that hierarchical shape functions in a one-dimensional example may be represented in a variety of different forms. Further, it should be remembered that hierarchical shape functions may be defined for other element types (e.g., rectangular, triangular, tetrahedral, etc.) in greater dimension (e.g., 2-D, 3-D, etc.).

Due to strict non-negativity properties of hierarchical shape functions, there are no internal cancellations within an element when integrated. Continuing the example of FIG. 3A above, example hierarchical shape functions as defined in 1D for this example may be:

$$S_1(x)=1-x$$

$$S_2(x)=4x-4x^2$$

$$S_3(x)=x.$$

Figure 4A:
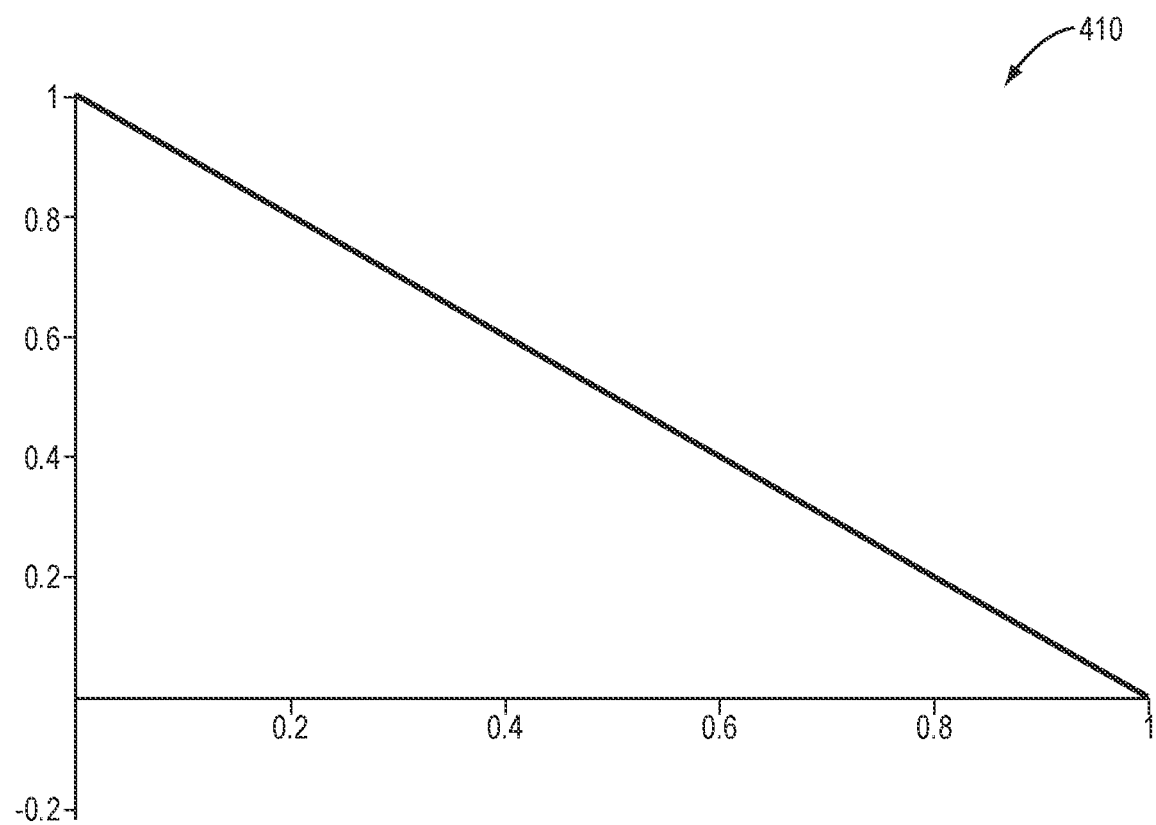
FIG. 4A is a graph of a first example hierarchical shape function $S_1$ plotted on the reference element K of FIG. 3A.
Figure 4B:
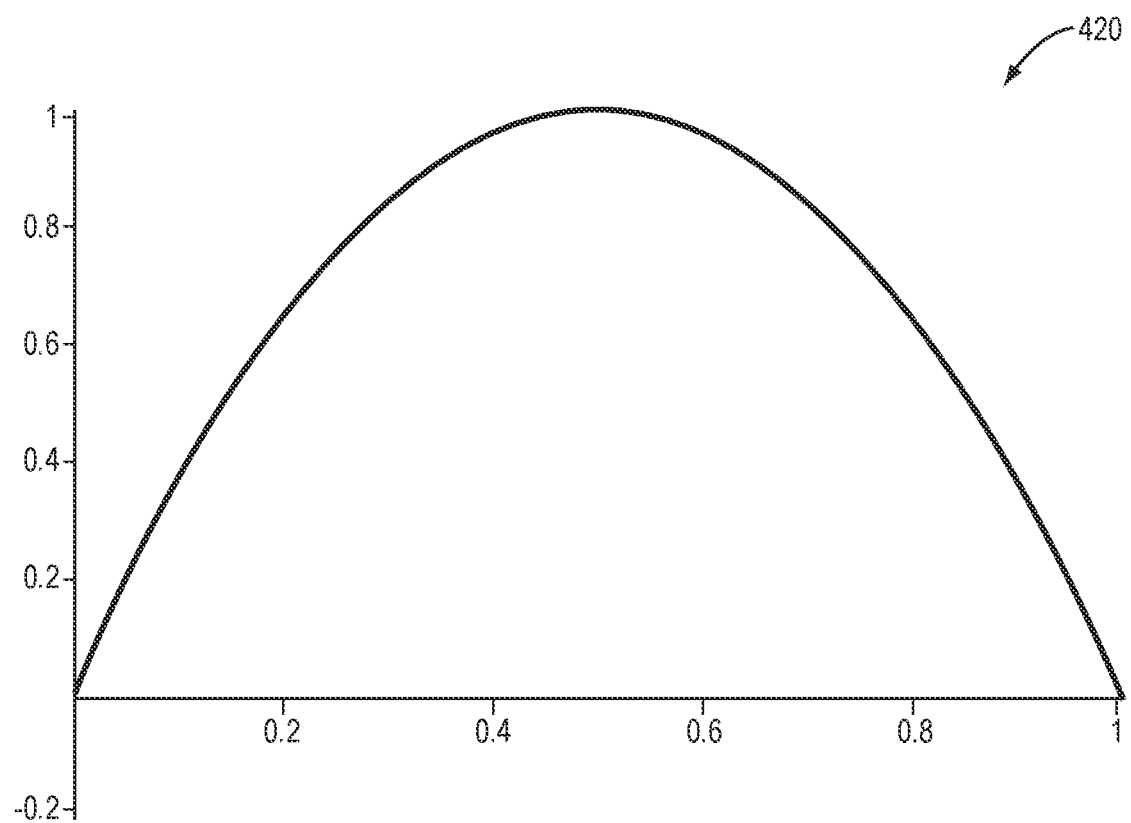
FIG. 4B is a graph of a second example hierarchical shape function $S_2$ plotted on the reference element K of FIG. 3A.
Figure 4C:
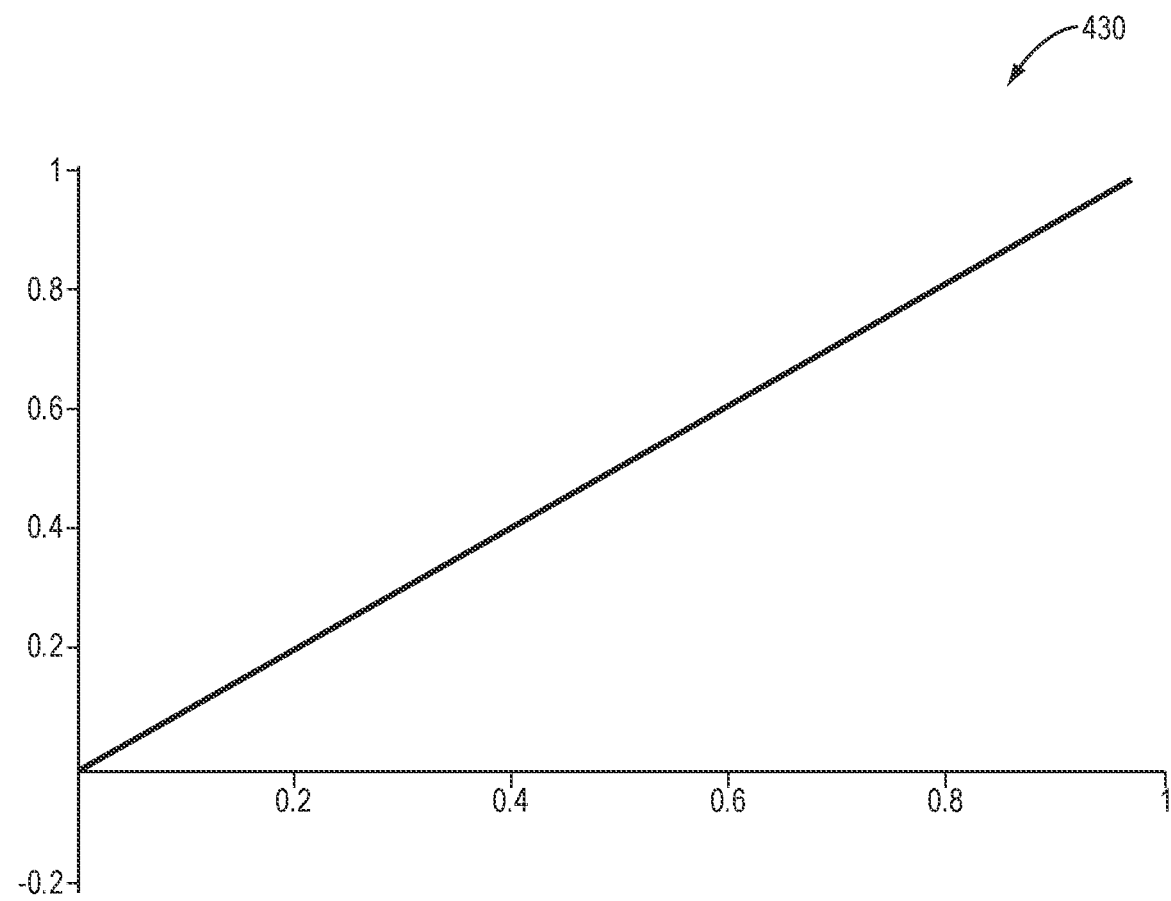
FIG. 4C is a graph of a third hierarchical shape function $S_3$ plotted on the reference element K of FIG. 3A.

FIG. 4A is a graph 410 of the first example hierarchical shape function $S_1$ plotted on the reference element K of FIG. 3A. FIG. 4B is a graph 420 of the second example hierarchical shape function $S_2$ plotted on the reference element K of FIG. 3A. FIG. 4C is a graph 430 of the third hierarchical shape function $S_3$ plotted on the reference element K of FIG. 3A. As can be seen from these graphs 410-430, the functions are all non-negative. Therefore, integration over only a part of an element still will result in a well-conditioned system matrix and right-hand side vector, and a stable numerical solution.

To use hierarchical shape functions in MPM-based geotechnical analysis and simulation the example integration above used by the solver module 150, working together with the numerical integration sub-module 155, may be modified to be:

$$\int_K N_i \approx \Sigma_p w_p N_i(x_p)$$

where $S_i$ is a hierarchical shape function and the other terms are as above.

Hierarchal shape functions may not satisfy several mathematical properties that are useful for MPM. One such property is partition-of-unity. Partition-of-unity provides that the sum of all shape functions on an element is equal to one at every point x of the element, which may be represented as:

$$\Sigma_i S_i(x) = 1 \forall x.$$

This property may be used when interpolating state variables, such as velocity and acceleration, from material points in an element to the background mesh. In conventional MPM, this typically involves calculating a mass-weighted sum, for example:

$$m_i v_i = \sum_p m_p S_i(x_p) v_p$$

where $m_i$ is mass associated with background mesh node i, $v_i$ is velocity associated with background mesh node I, $m_p$ is mass associated with material point p, $v_p$ is velocity associated with material point p, and $x_p$ is position of material point p.

When certain hierarchical shape functions are used as $S_i$ in such a formulation, partition-of-unity may be violated. For instance, returning to the example discussed above with a one-dimensional linear reference element K=[0,1] and hierarchal shape functions $S_1$, $S_2$, $S_3$, it can be seen that:

$$\Sigma_i S_i(x) = 4x - 4x^2 \neq 1.$$

Therefore, if the above-discussed mass-weighted sum were calculated and used to interpolate state from material points to nodes of the background mesh in a conventional manner, the results would be incorrect.

In one implementation, to address this issue, interpolation operations may be altered to subtract out contributions to the state variables of any lower-order polynomial from any higher-order polynomials of the hierarchical shape functions to compensate for lack of a partition of unity property. For lowest-order shape functions, the above discussed formula for calculating a mass-weighted sum may be used. For example, returning to the example discussed above with a one-dimensional linear reference element K=[0,1], shape functions $S_1$ and $S_3$ are lowest-order (specifically, first-order or linear) polynomials. So for $S_1$ and $S_3$ the above discussed formula of:

$$m_i v_i = \sum_p m_p S_i(x_p) v_p$$

may be used.

However, for higher-order shape functions, contributions to the state variables of any lower-order polynomial should be subtracted out. For example, returning to the example discussed above with a one-dimensional linear reference element K=[0,1], shape function $S_2$ is a higher-order polynomial specifically, second-order or quadradic. Shape functions $S_1$ and $S_3$ are lower-order with respect to $S_2$. Accordingly, the formula for calculating the mass-weighted sum may be altered to provide:

$$m_2 v_2 = \Sigma_p m_p S_2(x_p)(v_p - v_0 S_0(x_p) - v_1 S_1(x_p)).$$

In general, this formula can be formulated as:

$$m_i v_i = \sum_p m_p S_i(x_p)(v_p) - \sum_j (v_j S_j(x_p))$$

with index i running over all $2^{nd}$ order shape functions and index j running over all $1^{st}$ order shape functions.

While the above examples involve hierarchical shape functions with two orders of polynomials, it should be understood that the technique can be readily extended to hierarchical shape functions that include greater numbers of orders (e.g., 3, 4, etc.).

In addition, hierarchal shape functions may not satisfy the Kronecker delta property. The Kronecker delta property provides that all shape functions are 1 on their associated node and 0 on all other nodes. This may be represented as:

$$S_i(x_j) = \delta_{ij}$$

where $S_i$ is a shape function and $x_j$ is a position. This property may be used when calculating boundary conditions for material points of an element.

However, when certain hierarchical shape functions are used as $S_i$, the Kronecker delta property may be violated. For instance, returning to the example discussed above with a one-dimensional linear reference element K=[0,1] and hierarchal shape functions $S_1$, $S_2$, $S_3$, it can be seen that:

$$S_1\left(\frac{1}{2}\right) = S_3\left(\frac{1}{2}\right) = 1/2$$

Since position ½ is associated with shape function $S_2$, not $S_1$ and $S_3$, the Kronecker delta property suggests that value should be 0, not ½. Simply applying the values of prescribed field to the nodes leads to an incorrect signal.

In one implementation, to address this issue, boundary condition calculation may be altered to subtract out contributions of any lower-order polynomial from any higher-order polynomials of the hierarchical shape functions to compensate for lack of a Kronecker delta property. For lowest-order shape functions, values of a prescribed field $u_0$ at associated nodes may be used. For example, returning to the example discussed above with a one-dimensional linear reference element K=[0,1], shape functions $S_1$ and $S_3$ are lowest-order (specifically, first-order or linear) polynomials. So for $S_1$ and $S_3$:

$$u_1 = u_0(x_1) \text{ and } u_3 = u_0(x_3)$$

where $x_1$ and $x_3$ are positions of nodes associated with shape functions $S_1$ and $S_3$, respectively.

However, for higher-order shape functions, contributions of any lower-order polynomial should be subtracted out. For example, returning to the example discussed above with a one-dimensional linear reference element K=[0,1], shape function $S_2$ is a higher-order polynomial specifically, second-order or quadradic. Shape functions $S_1$ and $S_3$ are lower-order with respect to $S_2$. So, for $S_2$:

$$u_2 = u_0(x_2) - u_1 S_1(x_2) - u_3 S_3(x_2)$$

where $x_2$ is the position of the node associated with shape functions $S_2$,

While the above examples involve hierarchical shape functions with two orders of polynomials, it should be understood that the technique can be readily extended to hierarchical shape functions that include greater numbers of orders (e.g., 3, 4, etc.).

Figure 5:
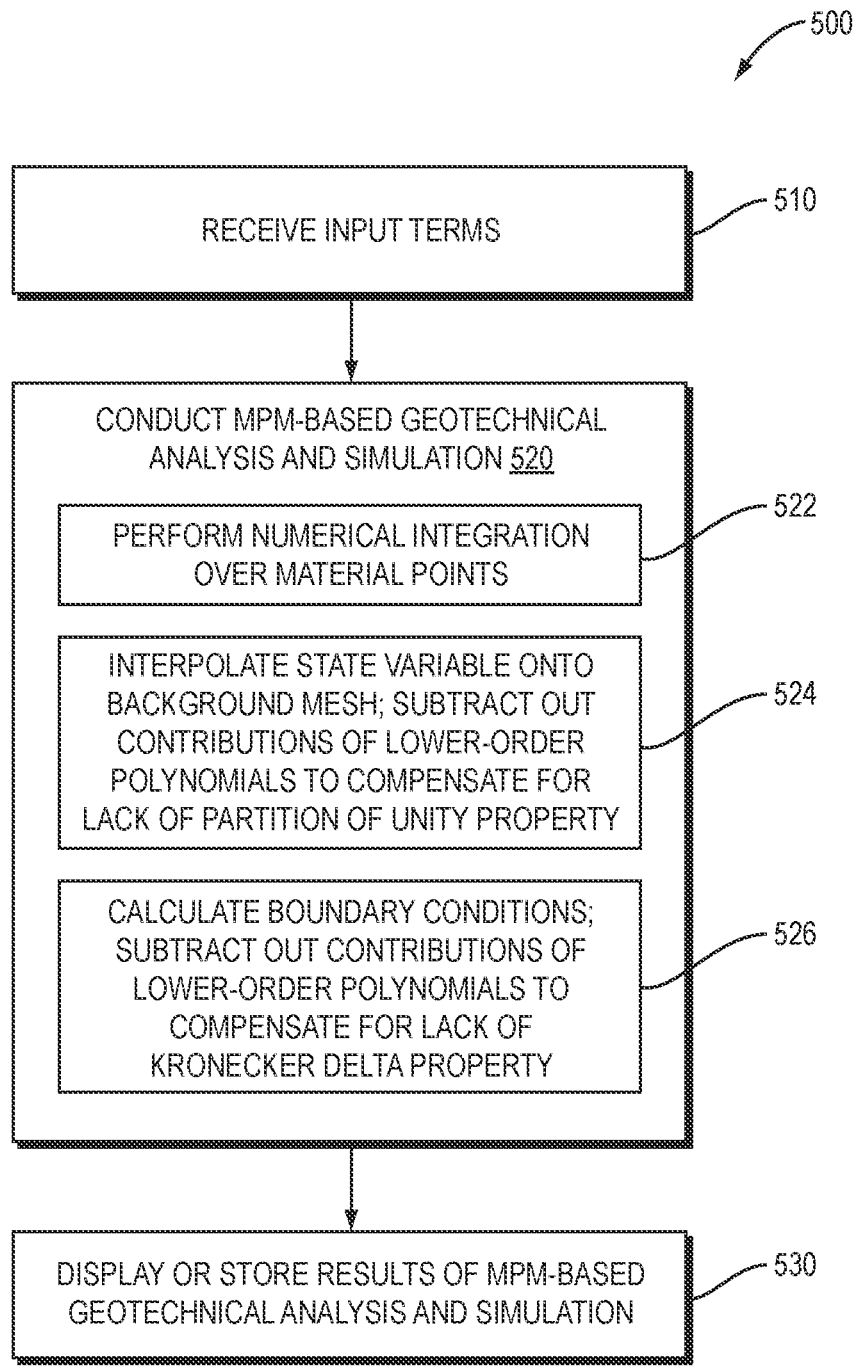
FIG. 5 is a flow diagram of an example sequence of steps that may be performed by geotechnical engineering software to use hierarchical shape functions in MPM-based geotechnical analysis and simulation.

FIG. 5 is a flow diagram of an example sequence of steps 500 that may be performed by the geotechnical engineering software to use hierarchical shape functions in MPM-based geotechnical analysis and simulation. The steps 500 may summarize the material discussed above. At step 510, the solver module 150 receives input terms. The input terms may include positions of the material points in at least one element of a background mesh, among other information.

At step 520, the solver module 150 conducts a MPM-based geotechnical analysis and simulation using the input terms. As part of step 520, the solver module 150 may perform a number of sub-steps, which may occur in parallel or sequentially. At sub-step 522, a numerical integration is performed over the material points to produce a system matrix and right-hand side vector. Such numerical integration applies hierarchical shape functions to the material points, which include at least one higher-order polynomial and lower-order polynomials. At sub-step 524, one or more state variables for the material points are interpolated to the background mesh. The interpolating may subtract out contributions to the state variables of any lower-order polynomials from higher-order polynomials of the hierarchical shape functions to compensate for lack of a partition of unity property. Likewise, at subs-step 526, one or more boundary conditions for the material points are calculated. The calculation may subtract out contributions to a resulting field of any lower-order polynomials from higher-order polynomials of the hierarchical shape functions to compensate for loss of Kronecker delta property.

At step 530, results of the MPM-based geotechnical analysis and simulation are displayed by the geotechnical engineering software in a user interface, stored to an computing device-readable medium, or otherwise used.

It should be understood that various adaptations and modifications may be readily made to what is described above, to suit various implementations and environments. While it is discussed above that certain steps may be implemented in a specific sequence, it should be understood that other sequences may be used, and that such sequences may include additional, intervening steps, steps implemented in parallel, and the like. While it is discussed above that aspects of the techniques may be implemented by specific software processes executing on specific hardware, it should be understood that some or all of the techniques may also be implemented by different software on different hardware. In addition to general-purpose computing devices, the hardware may include specially configured logic circuits and/or other types of hardware components. Above all, it should be understood that the above descriptions are meant to be taken only by way of example.

What is claimed is:

1. A method for using shape functions in material point method (MPM)-based geotechnical analysis and simulation, comprising:
receiving, by a module of geotechnical engineering software executing on one or more computing devices, material points that cover at least a portion of an element of a background mesh that describe a continuum of soil, rock and/or groundwater;
conducting a MPM-based geotechnical analysis and simulation that includes the element at least in part by:
performing a numerical integration over the material points to produce a system matrix and right-hand side vector, the numerical integration to apply hierarchical shape functions to the material points, the hierarchical shape functions to include at least one higher-order polynomial and lower-order polynomials, and
interpolating one or more state variables for the material points to the background mesh, the interpolating to subtract out contributions to the state variables of any lower-order polynomials from higher-order polynomials of the hierarchical shape functions to compensate for lack of a partition of unity property; and
at least one of displaying in a user interface, or storing to a computing device-readable medium, results of the MPM-based geotechnical analysis and simulation.

2. The method of claim 1, wherein the conducting the MPM-based geotechnical analysis and simulation further comprises:
calculating one or more boundary conditions for the material points, the calculating to subtract out contributions to a resulting field of any lower-order polynomials from higher-order polynomials of the hierarchical shape functions to compensate for loss of Kronecker delta property.

3. The method of claim 1, wherein the background mesh includes a plurality of elements, and the MPM-based geotechnical analysis and simulation is performed over the material points of each of the plurality of elements.

4. The method of claim 1, wherein the hierarchical shape functions are each non-negative functions.

5. The method of claim 1, wherein the material points only partially cover the element.

6. The method of claim 1, wherein the element is a two-dimensional or three-dimensional element.

7. The method of claim 1, wherein the performing the numerical integration comprises:
determining the system matrix and right-hand side vector using the expression $$\int_K S_i \approx \Sigma_p w_p S_i(x_p)$$

where K is the element of the background mesh, $S_i$ is a hierarchical shape function, $x_p$ is position of a material point p, and $w_p$ is an integration weight of the material point p.

8. The method of claim 1, wherein the state variables include at least one of velocity and acceleration.

9. The method of claim 8, wherein hierarchical shape functions include quadratic and linear terms.

10. A computing device, comprising:
a display screen;
a processor; and
a memory coupled to the processor and configured to store geotechnical engineering software, the geotechnical engineering software including:
a mesher module configured to generate a background mesh composed of elements formed from nodes, each element including material points that describe a continuum of soil, rock and/or groundwater,
a solver module configured to use material point method (MPM) to perform analysis and simulation of behavior of the soil, rock and/or groundwater at least in part by performing numerical integration on each element, the numerical integration to use hierarchical shape functions,
wherein the analysis and simulation of behavior of the soil, rock and/or groundwater includes interpolating one or more state variables for the material points to the background mesh and/or calculating one or more boundary conditions for the material points, and the solver module is further configured to subtract out contributions of any lower-order polynomials from higher-order polynomials of the hierarchical shape functions when interpolating the one or more state variables for the material points to the background mesh, or to subtract out contributions any lower-order polynomials from higher-order polynomials of the hierarchical shape functions when calculating the one or more boundary conditions for the material points.

11. The computing device of claim 10, wherein the hierarchical shape functions are each non-negative functions.

12. The computing device of claim 10, wherein the material points only partially cover at least one of the elements.

13. The computing device of claim 10, wherein the elements are two-dimensional or three-dimensional elements.

14. A non-transitory computing device readable medium having instructions stored thereon, the instructions when executed by one or more computing devices operable to:
receive material points that cover at least a portion of an element of a background mesh that describe a continuum of soil, rock and/or groundwater;
conduct a material point method (MPM)-based geotechnical analysis and simulation that includes the element at least in part by:
performing a numerical integration over the material points to produce a system matrix and right-hand side vector, the numerical integration to apply hierarchical shape functions to the material points, the hierarchical shape functions to include at least one higher-order polynomial and lower-order polynomials, and
calculating one or more boundary conditions for the material points, the calculating to subtract out contributions to a resulting field of any lower-order polynomials from higher-order polynomials of the hierarchical shape functions to compensate for loss of Kronecker delta property; and
at least one of display in a user interface, or store to a computing device-readable medium, results of the MPM-based geotechnical analysis and simulation.

15. The non-transitory computing device readable medium of claim 14, wherein the instructions to conduct the MPM-based geotechnical analysis and simulation further comprises instructions that when executed are operable to:
interpolate one or more state variables for the material points, the interpolation to subtract out contributions to the state variables of any lower-order polynomials from higher-order polynomials of the hierarchical shape functions to compensate for lack of a partition of unity property.

16. The non-transitory computing device readable medium of claim 14, wherein the hierarchical shape functions are each non-negative functions.

17. The non-transitory computing device readable medium of claim 14, wherein the background mesh includes a plurality of elements, and the MPM-based geotechnical analysis and simulation is performed over the material points of each of the plurality of elements.

18. The non-transitory computing device readable medium of claim 17, wherein the material points only partially cover of at least one of the elements.

19. The non-transitory computing device readable medium of claim 17, wherein the elements are two-dimensional or three-dimensional elements.

20. The non-transitory computing device readable medium of claim 14, wherein the performing the numerical integration comprises:
determining the system matrix and right-hand side vector using the expression $$\int_K S_i \approx \Sigma_p w_p S_i(x_p)$$

where K is the element of the background mesh, $S_i$ is a hierarchical shape function, $x_p$ is the position of a material point p, and $w_p$ is the integration weight of the material point p.

* * * * *